(12) United States Patent
Sadre

(10) Patent No.: US 8,131,627 B2
(45) Date of Patent: Mar. 6, 2012

(54) OPEN CLEARING SYSTEM

(76) Inventor: Mamoud Sadre, Windham, NH (US)

( * ) Notice: Subject to any disclaimer, the term of this patent is extended or adjusted under 35 U.S.C. 154(b) by 1739 days.

(21) Appl. No.: 10/770,131

(22) Filed: Feb. 3, 2004

(65) Prior Publication Data

US 2004/0153403 A1 Aug. 5, 2004

Related U.S. Application Data

(63) Continuation-in-part of application No. 09/640,272, filed on Aug. 17, 2000, now abandoned.

(51) Int. Cl.
*G06Q 40/00* (2006.01)
(52) U.S. Cl. .......................... 705/37; 705/35
(58) Field of Classification Search .................. 705/35, 705/37
See application file for complete search history.

(56) References Cited

U.S. PATENT DOCUMENTS 6,493,683 B1 * 12/2002 David et al. .................... 705/37
6,912,510 B1 * 6/2005 Shepherd ........................ 705/37

OTHER PUBLICATIONS www.nyse.com, Dec. 16, 2001.*

* cited by examiner

*Primary Examiner* — Lindsay M Maguire
*Assistant Examiner* — James Vezeris

(57) ABSTRACT

An open clearing system allows local brokerage businesses to operate as autonomous exchanges with full inter connectivity to commercial bank(s). The system integrates cash management, order matching, clearing and settlement. The inter connectivity is based on the key concept of creating an engine as a "hub" independent from local Nodes. All Nodes are "piped" to the hub utilizing a common interface. This will allow orders to be matched between any two Nodes. In this manner an order placed in Node A will clear for matching at Node B for the same financial instrument. The system provides cash settlement at Nodes with different local time zone. For physical settlement Commerce Interface (to bonded warehouses) provides on line physical delivery at three linked designated bonded warehouses.

15 Claims, 14 Drawing Sheets

The Matching Process

Legend:
User- 101; Fiduciary account- 102; Escrow account -103

Fiduciary Account            Escrow Account

Cash Management of Fixed Currency        FIG.1

Legend:
User-201; User interface-202
Banker interface-203; System-204; Partner bank-205

Cash Management Interface

Legend:
Buyer bid-301; Seller ask-302; User interface-303
Order creation-304; Order match clearing- 305
Fiduciary account-306; Performance bond-307; Escrow account-308

The Matching Process

Legend:
Buyer-351
Warehouse service provider-352
Seller-353
Warehouse interface-304
System-305
Fiduciary account-306
Escrow account-307

Physical Delivery Settlement

Legend:
System-501
Party 1-502; Party 2-503
Fiduciary account-504; Escrow account-505

(1) Transfer of Offset Amount from Party 1 to Party 2

(2) Refund of Performance Bond to Party 2

(3) Refund of Balance of Performance Bond to Party 1

Cash (Offset) Settlement     FIG.5

Legend:
User-601; User's bank-602; User interface-6033
Partner bank-604; Bank interface-6055; Systeem-6066; Clearinghouse-6077

Clearing Process Between Two Nodes        FIG. 6

Legend:
Virtual private network- 701
Boston-702; Frankfurt-703; London- 704; Singapore-705; Hong Kong-706; Tokyo-707; Seoul-708

Inter-networking of Nodes

Legend:
Virtual private network-701
Node 1- 802; Node 2-803; Node 3-804; Node N-805
Bank interface-806; Partner bank-807

Open Architecture Clearing

Legend:
Node A and Node B-901
Fiduciary – 902; Escrow-903; Local currency- 904; US Dollar-905
Buyer-906; Seller-907
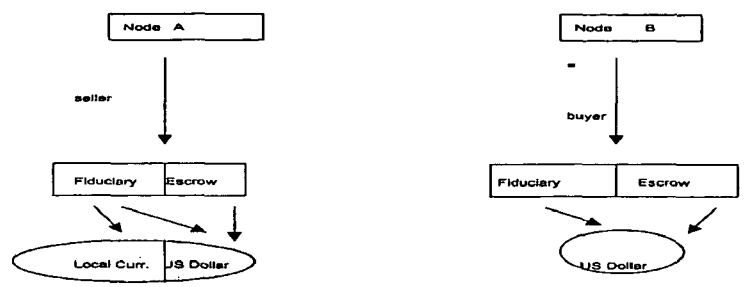
Node's Fund Maintenance          FIG. 9

Legend: F: foreign; V: variable; ACH: automatic clearinghouse; ETF: electronic fund transfer
NODE A-1001; NODE B-1003; Fiduciary account at local banks-1002
MACHA format-1004; Other national clearinghouse fixed/variable currency-1005;
ACH/EFT- 1006; Currency conversion, daily-1007

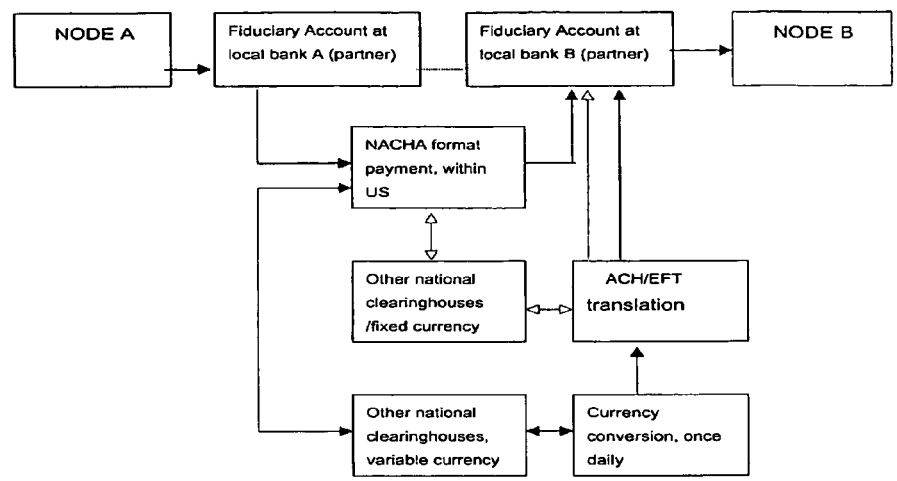

1) ACH payments in the US
2) ACH /other EFT payments translation, F-F currencies
3) ACH /other EFT payments translation, F-V/V-F currencies Inter Nodal Payments        FIG. 10

Legend:
Time-1101; Eastern Standard Time- 3: 1102; Est-1102; EST+6: 1103; EST+14: 1104

| Time | EST-3 | EST | EST+6 | EST+14 |
|---|---|---|---|---|
| Location | San Jose | New York | Frankfurt | Hong Kong |
| Operating | 8 am to 3 pm | 10 am to 5 pm | 10 am to 6 p m | 8 am to 4 p m |
| EST Relative Position | mostly open | open | Partially open | closed |

Nodes operating in local time

Nodes Operating In Local Time      FIG.11

| event | Node at | DAY 1- 10am | 14 | 18 | 22 | DAY 2- 2AM | 6 | 10 | 14 | 18 | 22 | DAY 3-2AM |
|---|---|---|---|---|---|---|---|---|---|---|---|---|
| pin activation | | | | | | | | | | | | |
| trade exec | New York | | | | | | | | | | | |
| trade exec | London | | | | | | | | | | | |
| trade exec | Tokyo | | | | | | | | | | | |
| match made | Frankfurt | | | | | | | | | | | |
| match made | San jose | | | | | | | | | | | |
| match made | New York | | | | | | | | | | | |
| match made | Singapore | | | | | | | | | | | |
| order cleared | | | | | | | | | | | | |
| order settled | | | | | | | | | | | | |

2- day time frame for clearing and settlement

2-Day Time Frame For Clearing And Settlement

FIG.12

| Choices | Tag no | Field name | content |
|---|---|---|---|
| Mandatory | 20 | Sender's reference | 16x |
| Mandatory | 23B | Bank operation code | 4a |

| Choices | Tag no | Field name | content |
|---|---|---|---|
| Optional | 23E | Instruction code | 4a, 30x as option |

| Choices | Tag no | Field name | content |
|---|---|---|---|
| Optional | 26T | Transaction type code | 3a |
| Mandatory | 32a | Value date/currency/interbank settled account | 6n3a15 no.'s |
| Optional | 33B | Currency/original ordered amount | 3a15 No.'s |
| Optional | 36 | Exchange rate | 12 No.'s |
| Mandatory | 50K | Ordering customer | 4*35k, 34x as option |
| Optional | 51A | Sending institution | A |
| Optional | 52a | Ordering institution | A or D |
| Optional | 53a | Sender's correspondence | A, B or D |
| Optional | 54a | Receiver's correspondence | A, B or D |
| Optional | 55a | Third reimbursement institution | A, B or D |
| Optional | 56a | Intermediary institution | A, C or D |
| Optional | 57a | Account with institution | A, B, C, or D |
| Mandatory | 59 | Beneficiary customer | 4*35x, 34x as option |
| Optional | 70 | Remittance information | 4*35x |
| Mandatory | 71A | Details of charges | 3a |
| Optional | 71F | Sender's charges | 3a15 No.'s |
| Optional | 71G | Receiver's charges | ditto |
| Optional | 72 | Sender to receiver information | 6*35x |
| Optional | 77B | Regulatory reporting | 3*35x |
| Optional | 77T | Envelope contents | 9000z |

S.W.I.F.T format specification for single fund transfer message, MT 103

S.W.I.F.T Formal Specification For Single fund Transfer Message, MT 103

FIG.13

| Choices | Tag no | Field name | content |
|---|---|---|---|
| Mandatory | 20 | Transaction reference number | 16x |
| Optional | 21 | Related reference | 16x |
| Mandatory | 25 | Account identification | 35x |
| Mandatory | 28C | Statement no./sequence no. | 5n , 5n optional |
| Mandatory | 60a | Opening balance | 1!a6!n3!a15d |
| Optional | 61 | Statement line | 6!n[4!n]2a[1!a]15d1!a3!c16x[//16x][34x] |
| Optional | 86 | Information to account owner | 6*65x |
| Mandatory | 62a | Closing balance (booked funds) | 1!a6!n3!a15d |
| Optional | 64 | Closing available balance | ditto |

| | | | |
|---|---|---|---|
| Optional | 65 | Forward available balance | 1!a6!n!3!a15d |

| | | | |
|---|---|---|---|
| Optional | 86 | Information to account owner | 6*65x |

S.W.I.F.T format specification for Customer statement message, MT 940

S.W.I.F.T Formal Specification For Customer Statement Message, MT 940     FIG.14

OPEN CLEARING SYSTEM

Response to Specification Objection #2—Cross reference to related application: (previously submitted) This application is continuation in part (CIP) to previous application: Risk Management for Manufacturing, Ser. No. 09/640,272 dated Aug. 17, 2000, now abandoned Risk Management for Manufacturing

BACKGROUND

The business of trading financial instruments involves three distinct disciplines.
1. Pre-trade: Provides the vital information allowing the user to develop a trading strategy. The information comes in the form of market news or market specific data. Such information is generally disseminated through a marketplace. The legal ownership of market data is not yet fully established, but for now, the existing exchanges "sell" market data directly or through data vendors to public. This segment of industry is by itself quite significant and is dominated by major news organizations.
2. Trade execution: Generally, the entities (or exchanges) develop and maintain standard products which can be traded in terms of financial instruments. These structured products are listed and traded according to certain rules established by exchanges. In recent years trading of a large number of unstructured contracts executed between buyer and seller and assisted by dealer, are becoming more dominant.
3. Post trade: The closing of the loop (trade cycle) requires the clearing of the transaction and settling the account. This implies coordination of payments among the so called "counter parties". The clearing phase must be accompanied with respective trade settlement. Settlement is defined as legal transfer of title of financial instrument. It means transmitting, reconciling and confirming payment for security or physical and transfer instructions as prescribed by the clearing organization. The final positions for settlement are established on a net basis. In the security industry a Central Securities Depository (CSD) normally carries out such settlement.

The main functions of clearing address the specific and well established requirements. They are:
Assumption of obligations as a (central) counter party between buyer and seller of securities. This results in taking position (counter party at a time) by the organization and therefore protecting the party from financial risk.
Netting as referred to cash offset (of buying and selling) amount that would be "settled" as total amount paid or received.
Instruction to Settlement (entity) to execute payment transaction such as payment.

Any discrepancy in settlement is referred to the clearing organization as the trade guarantor.

The heart of financial clearing and settlement is payments. The business of "payments" is the domain of banking industry. Within that industry few options are available when the issue of electronic commerce payment is addressed. The options are even less if demand deposit is to be used as means of payment. One reason for this inadequacy may be that the present clearing and settlement infrastructure are not suitable for consumers and businesses. This lack of adaptability stems from the requirement of continuous availability of market liquidity. The requirement stems from the heavy reliance on credit worthiness of the counter parties. For typical trading houses, that physically buy and sell products, any bi-lateral contract bears the risk of default by either party.

The issue of the time elapsed between the clearing and settlement is central to the extent that minimizing the risk requires a real time or near real time (same day) clearing and settlement. This is in sharp contrast to present period of several days now prevalent in the industry.

The Securities Industry Association (SIA) in its recent white paper states that immediate and final payment system at affordable price for businesses do not currently exist. Transition from "one to several days" interval for clearing and settlement to real time or near real time would require the banks, for example, to modify their internal accounting systems as well as their interfaces with clearing and settlement systems.

With the above in mind, most exchanges own and manage (some time jointly) their clearing organizations. They clear trades through clearing members, who in turn act as second tier clearing for their customers. By adopting the hierarchical approach, the exchanges manage their financial risk by distributing their risk exposure among the second tier clearing entities (brokerage firms) in all financial transactions.

Still, the lack of information among the clearinghouses at a given time results in potentially dangerous risk. If top 25 brokerage firms extend maximum credit to their customer and a customer walks away from the obligation there is no "global clearing" that collects that information to send a warning signal. In other words, the presumed risk management is only as effective as the information one gets.

Recently a series of articles have appeared in trade publications justifying the need for an open clearing architecture. The most important issue raised refers to the clearing cost. Clearing is needlessly expensive. Existing fees range from $0.5 to $0.85 (and sometime $1.00 or more with surcharges). The real cost lies in duplication of capital. A member of more than one exchange must make a security or guaranty fund deposit with each of those clearinghouses (or buy stock in that clearinghouse). The four largest clearinghouses: BTCC, CME, NYMEX and NYCC have combined deposit or stock purchase requirements of nearly one billion US Dollars. The deposit amounts range from $100,000 to $2 million at each of the clearinghouses. This is in addition to the performance bond which is really used to guarantee the transaction. As much as $30 billion of performance bond may be held up in an exchange whose products are being cleared.

While some steps have been taken to remedy this problem (notably netting of original margin payments and cross-margin positions for specific products the obvious solution is one combined clearinghouse which for various reasons has proved impractical (except Options Clearinghouse Corporation (OCC) which was originally designed for that purpose, namely standardized securities options).

Another solution known as direct clearing or "one account settlement" requires the clearinghouses to work together towards that end. This is similar to arrangements made among regional exchanges (Philadelphia, Chicago, . . . and NYSE linked through a Regional Interface Organization or RIO program). A version of this is used by CME and SGX known as Mutual Offset System (MOS), whereby one exchange clearinghouse becomes another one's clearing member. This is the same arrangements between OCC and European Options Clearing.

To allow a clearing participant (member) clear a transaction with respect to different Clearing Counter Parties (CCP) a bilateral MOS based on a unique reciprocal "clearing member status" between two trading platforms takes place. Such "uniqueness" translates to virtual clearing as back-end operation. The virtual clearing is simply a "mirror image", or equal and opposite trade. MOS, when expanded multi-laterally, is the basis of Open Clearing. In a typical MOS, matched trades could be then "transferred" to clearing participants at any CCP in the system. The problem with this approach in that for n number of members n(n−1) connections are needed; a prohibitive cost.

SUMMARY OF THE INVENTION

Open Clearing System for commerce, or more specifically business to-business, envisages a direct clearing between any two trading houses among any number of trading centers (defined as Nodes) at specific market locations. Such markets may be identified on basis of concentration of producers and or consumers. The Nodes representing local market, will routinely match and execute trade in local currencies, clear the match and settle through their local banks. In order for traders to extend their trading beyond the local market all intra-Nodes will be able to match, execute and clear in a fixed currency. A settlement between the parties in two different Nodes, within NAFTA or EU region will then be calculated at "T" plus the time zone difference between the two Nodes participants.

The infrastructure of open clearing system for commerce consists of one stop matching-clearing Node, web connectivity with local commercial banks (Partner Bank) and a common clearing "hub". This Hub and Spoke-model replaces costly and not yet available centralized clearing model.

The major benefit of this invention is its fulfillment of essential requirements of clearing which are speed, low cost and reliability. By adopting National Automatic Clearing House Association (NACHA) payment Rules at each Node located within the US, Canada and Mexico, low cost is guaranteed and next-day settlement greatly reduces risk between clearing and settlement time. The ACH payment network is highly reliable based on its batch oriented electronic fund transfer system. The non ACH payments used elsewhere, although costlier than ACH still will be cost effective as compared to most existing clearinghouses.

Another benefit of the invention is to allow cross-border clearing treated as if the currency is fixed and currency conversion will be made at settlement time at local Node. This leads to an efficient clearing system for the marketplace.

Another advantage of the invention is to allow any existing fragmented clearing system, that serve the local market, to join the system with no significant infrastructure cost.

As an additional benefit, a high degree of Straight Through Processing (STP) is achieved by tight integration utilizing common Node interfaces.

Yet another advantage is further automating the trading functions, thereby narrowing the focus of system's back office users down to monitoring and handling exceptions. Transmission of transactions at each Node, is set up to run continuously. As the clearing is processed, the system handles confirmations, and updates transaction clearing information.

Another advantage is that cross border trading does not require currency conversion. Each Node settles the customer account in local currency.

Another advantage of the system is the ease of access to clearing and settlement by the user allowing better control of the cost involved.

Another advantage of the invention is its use of industry standards such as ACH payments and information transmittal using XML based format. This will ensure inter operability across most payment systems.

BRIEF DESCRIPTION OF DRAWINGS

FIG. 9—Fiduciary account explained in FIG. 1 assumes that all financial transactions are performed in local currency. Fund maintenance refers to the case where some transactions may require foreign currency translation; if so the Fiduciary account (902) will consist of two sub accounts, one in local currency (904) another in US Dollar.

FIG. 10—Inter nodal payment addresses foreign payments that may involve fixed (F) rate currencies, including dollar pegged, for example Chinese Yuan, or variable(V) rate currencies, for example euro. FIG. 1000 depicts the process flow, between two Nodes, for each of the scenarios under any system of payments. For fixed currency, the process flow applies Federal Reserve ACH system (1006) at fixed rate conversion (1007); whereas for, say, euro the process flow employs universal EFT (1005) after converting (1007) at offered rate at the time of clearing.

FIG. 11—All Nodes operate during normal daytime hours at local time based on US Eastern Standard Time(EST)

FIG. 12—Time elapsed for clearing based on different time zones

FIG. 13—SWIFT protocols specify various codes for monetary transaction such as fund transfer FIG. 14—SWIFT protocols specify various codes for messaging such as statement of account

DETAILED DESCRIPTION OF INVENTION

Figure 1:
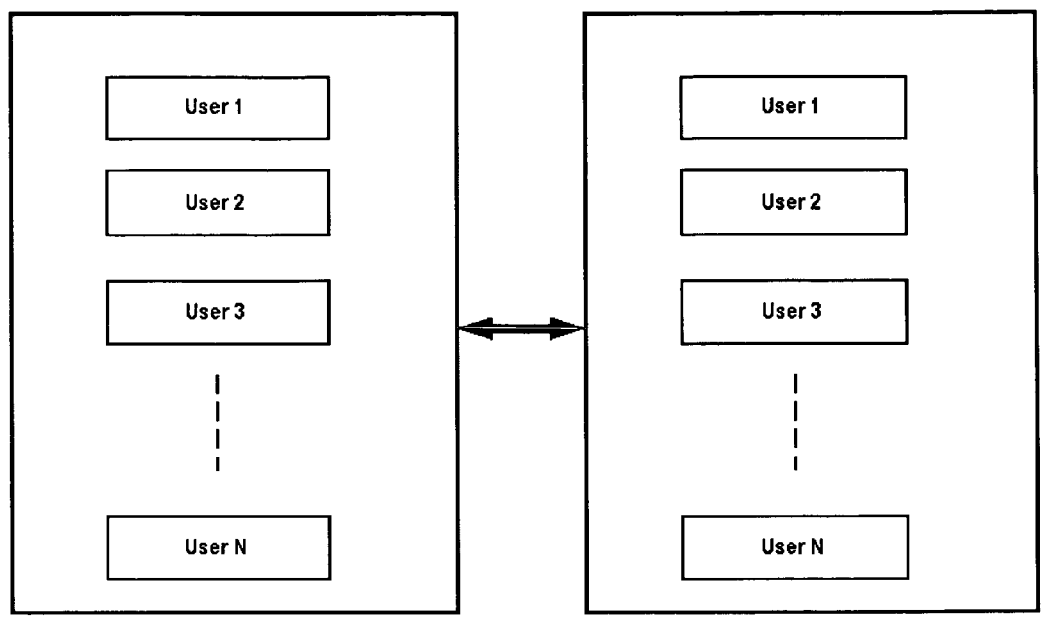
FIG. 1—Fiduciary Account (101) refers to permanent user account residing in the partner, bank. Escrow account (102) is an electronic virtual holding account that serves as a bookkeeping account for computer generated transactions.
Figure 2:
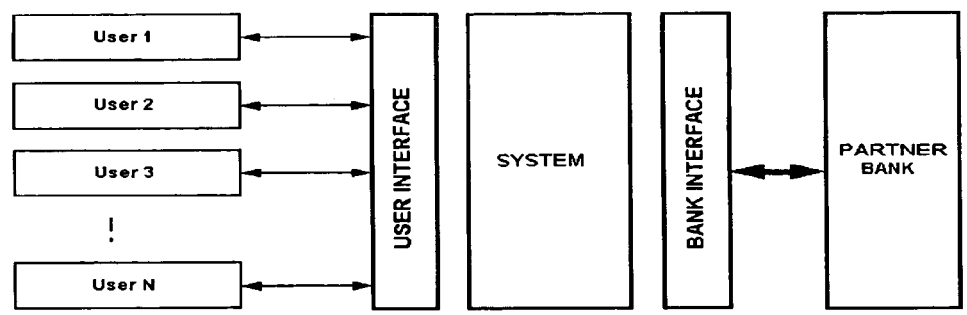
FIG. 2—System (204) refers to a Node of operation in a given location. Node is a computerized trading facility located in a country where it is licensed to trade physical goods. Interface is a computer program that provides communication protocol between two parties computers. User interface (202) is simply the worldwide web browser. Banks interface require additional layer(s) of communication such as Automatic Clearing House (ACH).
Figure 3:
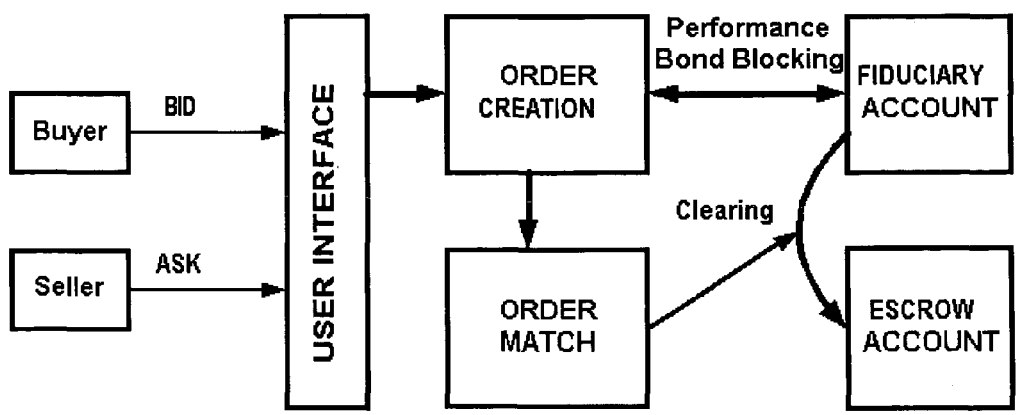
FIG. 3—Order (304) is a generated purchase or sale instruction based selected from menu on computer screen. Order match clearing (305) refers to identical buy and sell created by two different users. Performance bond (307) is an insurance or guarantee instrument for honoring an order if it is matched or filled. Clearing refers to book keeping transaction that ensures buyer and seller both have deposited the exact value of contract. In case of spot trade the warehouse receipt replaces cash.
Figure 4:
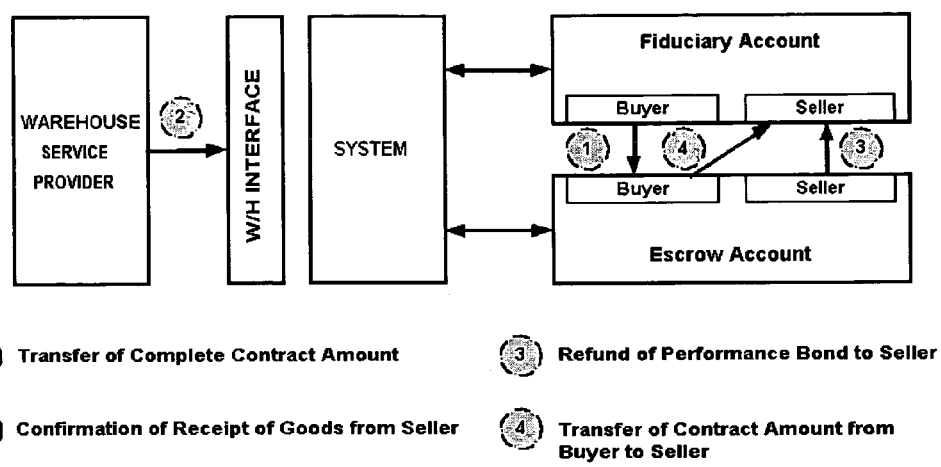
FIG. 4—Warehouse refers to a physical warehouse which is bonded (402), that is, guaranteeing the goods availability at all times based on the bill of lading provided to buyer. Physical delivery means electronic warehouse receipt as bill of lading.
Figure 5:
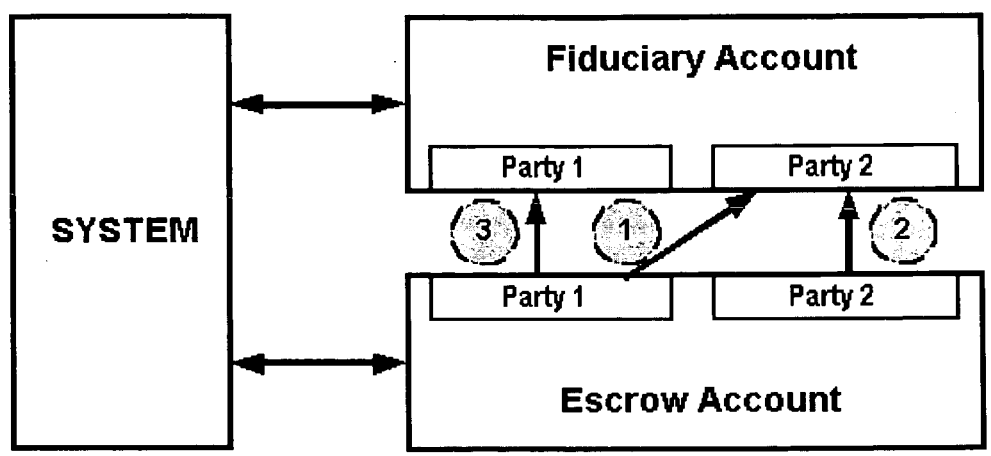
FIG. 5—Cash settlement refers to transaction settlement where no physical delivery is made yet, that is, the contract is not closed or completed, known as open contract.
Figure 6:
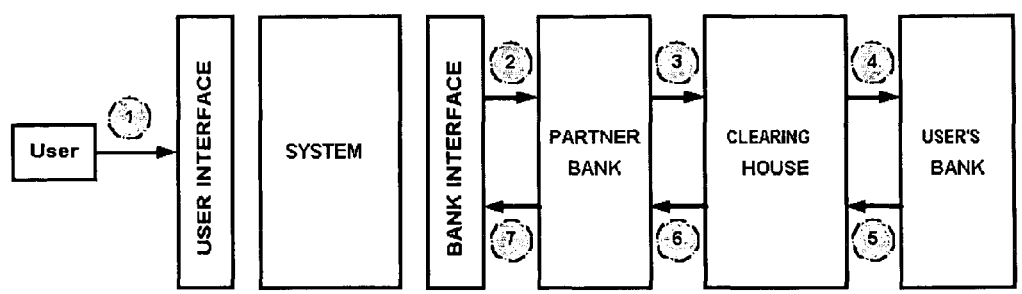
FIG. 6—The clearing process between two users (601 and 602') from any two nodes whose transaction is financially cleared (607)through their respective local banks 602 and 602' facilitated 605 by an independent financial institution, who in turn is linked to worldwide financial system.
Figure 7:
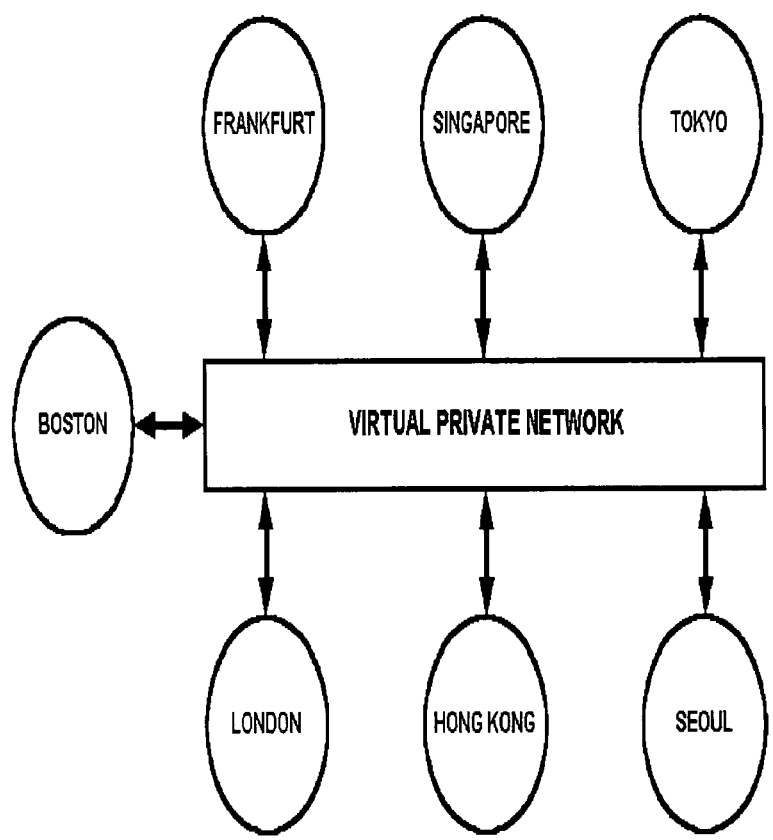
FIG. 7—Inter-networking refers to a secured network that is created by a unified interface among members of a group.
Figure 8:
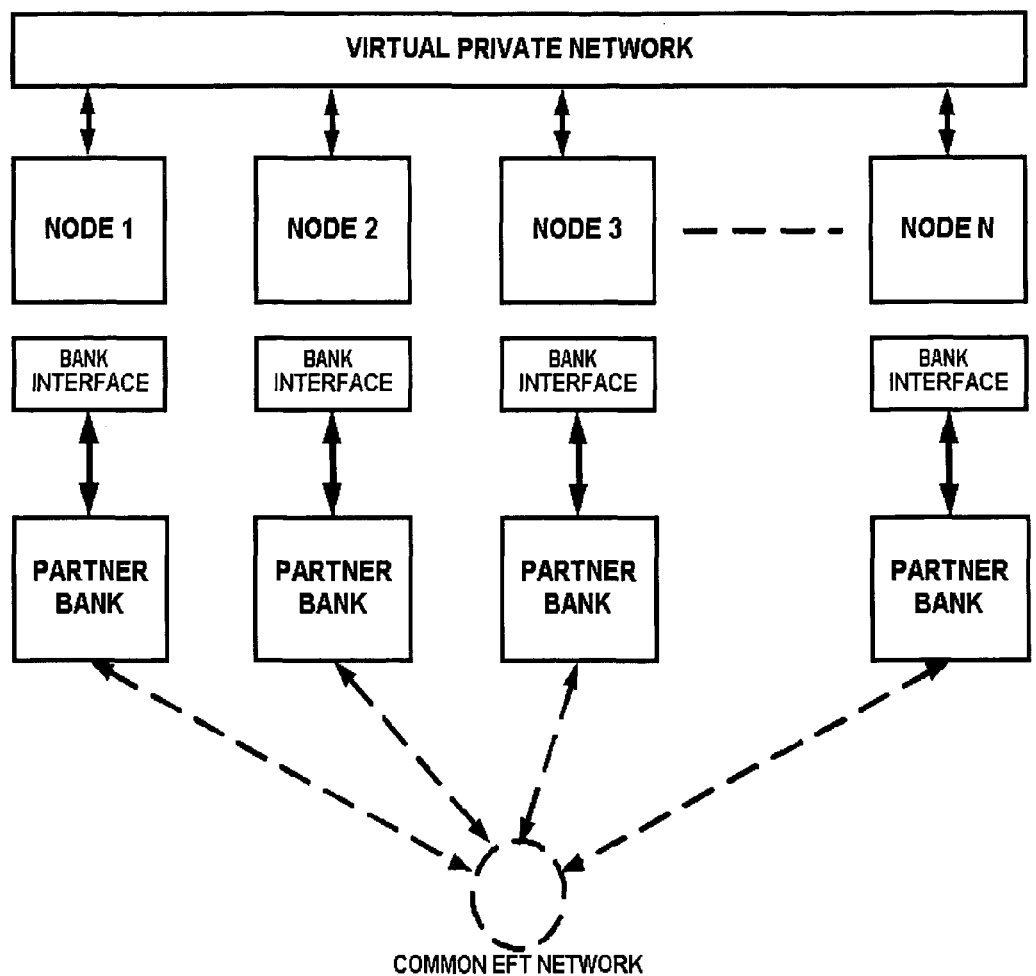
FIG. 8—Open clearing allows the Partner banks(807's) of all Nodes employ a common cash management as electronic fund transfer (EFT). Payment, as a subsystem of cash management, for example ACH—available in select part of world— or Society of Worldwide Interbank Financial Transaction (SWIFT) format MT103.

1. Elements of Open Clearing System consists of the following building blocks.

a) The Node is a local trading facility consisting of a trading platform, a core support team that manages day to day operation and on line connectivity with Partner bank and designated bonded warehouse. The operation may include product marketing, customer relation, logistical support and back office. Each Node's data center provides full trading cycle: pre-trade, order placing, matching execution and post trade activities. The Node's trading platform handles standard as well as semi-standard products with built-in Risk Management tools. The contract types range from forwards (swaps), to futures and options.

b) Interfaces—All Nodes maintain browser based uniform interface with local commercial (Partner) banks for On-line Clearing and Settlement. The Nodes will maintain a similar uniform interface with Bonded Warehouse Service Providers (as depository center) for Physical Delivery.

c) Inter networking—All Nodes are connected to a common "pipeline", at all times. This is accomplished through a Virtual Private Network.

d) The Matching Engine—Each Node's trading platform provides continuous double sided matching locally. The matching, based on certain criteria, can be extended to other Nodes which are operational and connected to the pipeline. A Central Order Booking (COB) is available at all times to all Nodes. All inter-Node matches are made in a universal fixed currency, FOB bonded warehouse, with all relevant trade information available to both parties. Each match will represent a "contract" originated at a Node proceeding the Node where match is made. The order of precedence is established by continuous time stamping 2. Clearing Engines—Any order placed at any Node will trigger "blocking" of funds available in Fiduciary account of the Node. The Fiduciary account is basically a demand deposit managed by ACH payment system and it is used for settlement purpose. When a match is made the order is executed and exact amount of performance bond will be kept in Escrow account. This type of clearing in local currency takes place in real-time followed by daily settlement. For inter-Nodal clearing a currency conversion to fixed currency takes place at a specific time of day such as Eastern Standard Time (EST). The clearing for inter-Node matching operates as a separate engine. It is a database engine which operating as Central Order Booking (COB) is able to make matches on demand initiated by a Node.

3. Settlement—At each local Node and at a designated time a batch process for settlement takes place A) For expired contracts against physical delivery
  B) For expired contracts with cash-offset
  C) For open contracts marked-to-market and adjustment to performance bond All settlements are performed in local currencies.
  Both Fiduciary and Escrow Accounts are commingled
  User Level Transaction Details are maintained within the System
  Netting Transaction is Communicated to the Partner bank at the day-end 4. Currency maintenance—Each Node will maintain a fiduciary account in the local currency for all participants. For the purpose of inter-Nodal trade a limited amount of Fixed Currency (FC) reserve is maintained at each node (where local currency is different) to cover short term fluctuation of currency conversion. The level of maintenance of FC reserve will be dependent on the level of FC transaction. At the time of settlement a buyer would normally deposits the required money in the Fiduciary account in his local currency. The converted amount is then deposited in Fiduciary account to be credited to seller. The conversion rates are inter-bank rates fixed at specific time of day (for example, EST). See FIG. 800

Order of precedence—The order of precedence is time of the order, and not the nature of the order. This means that if a buy order is initiated at Node A at time T and the match is made at node B with a sell order which was placed at time T−x, the settlement will be done at Node B. Node A will receive the settlement report obtained from Node B Cash Management The term cash management comprises a number of components that include payments, account owner information, various interfaces and batch data processing. The most critical element discussed here is the Payments System and in particular the NACHA format generally known as Automatic Clearing House (ACH).

Pre-amble: The history of ACH, as the most common payments system, goes back to one of the earliest version of electronic funds transfer. The concept is based on transferring ASCII files from an Originator to a Receiver via their respective depository file interfaces (the ODFI and RDFI). It has two phases. In phase one the ACH takes the position of one party to 'clear' the transaction. In the next phase it "settles" the account with the counter party.

a) CLEARING: In an ACH debit transaction "Receiver", for example a customer, authorizes "Originator", for example a broker, to forward a transaction data, for example buying security, to an ODFI (originator depository financial institution). ODFI sorts and sends it over to ACH operator. ACH operator distributes the ASCII file to RDFI which makes the fund available to receiver and reports the statement
  b) SETTLEMENT & posting deals with delivery or deposit of funds. The settlement takes place at Federal Reserve Bank of the appropriate region. The settlement is either an Offset collection or Reject or special handling.

Such payments system when bundled with book transfer transaction initiation capabilities as well as check services functionality would provide features and functions that help improve cash management productivity with greater speed, ease, flexibility and convenience. It offers sophisticated information reporting, It also provides File Import/Export for importing free form or pre-formatted payment information.

The payments system coupled with account information is relatively straight forward since the amount of cash is fixed and the period of delivery could be as long as three days or more. The financial risk is identified by "returns" reflecting failure of payment by a party. In an exchange environment, however, the clearing involves a number of other components that are time dependent. The amount of cash is only fixed if the price of financial instrument does not change. Since price changes are continually occur the clearing carries continuous financial risk, above and beyond the original fund commitment. The brokers and exchanges utilize certain tools to continually adjust such risk. Common practice of applying margin (a portion of the contract value) takes into account the customer credit status and the house rules, themselves variables. Taking these into consideration the exchange clearing should ideally be in real time or near real time. This implies a continuous clearing instead of discrete clearing function. In global scale the dimensions of location and currency should be taken into account.

The exchanges clearing and settlement systems are "stand alone" two step model that clear their "listed" products through an intermediary "clearing member". No clearing member can clear and settle without going through an exchange. The rigidity and proprietary nature of formal exchanges with respect to credit worthiness and rules as well as lack of standards are preventing brokers to trade at retail level competitively and globally.

Cash Management Applied to a Node

To address the above mentioned issues an model trading house (Node) is described below. The pre-requisite for a Node is the full convertibility of its local currency if itself not liquid. There must also exist at least one commercial bank that allows
- On-line facility to upload and download transactions
- Operation of an electronic payments system
- Participation in a common Network as Partner bank The Node maintains a Fiduciary account at designated local bank (Partner bank). The Node provides a secured web based interface to Partner local bank with following functions:
- Monitoring deposits made to Fiduciary account
- Real-time monitoring of account movement (in and out of Fiduciary)
- Multi-bank payment & receiving transaction information, including balances on accounts held at other Partner bank accounts (Fiduciary) such as intra-day, end-of-day and forward balance
- Historical data upon request on all transactions At each Node, a set of user interfaces (front end portal) are provided to accommodate web based banking transactions. A Node could in theory handle the functions of a Central Depository of Security (CDS)

The exchange of cash between originator and receiver is a simple application of payment system. It is generally accomplished as an Electronic Funds Transfers (EFT). To extend this approach to all Nodes a unified standardized payment system must be employed. One such standard may be adopted as international cash management; both domestic and the bank network payments. It consists of delivering payment instructions in real time (or near real time) for debiting an account held at member (Partner bank) and automatic payment (from debit statement).

The concept of routing the payment instruction through all Nodes network for execution at appropriate Node is the essential element of standardizing payment (for clearing) method. Movements on the accounts are then reported, in real time, daily and during day using interim message. The existing EFT, mostly as wire transfer, are costly and not appropriate for continuous debit/credit. To overcome this problem the most cost effective and reliable payments system is the ACH which is used extensively by businesses in the United States. Outside of the United States conversion from (and to) ACH is now available in Canada, Mexico and other select areas.

The implementation of common cash management platform using ACH as its basic payment system facilitates the exchange of data among these Nodes such as customer's account balance and fund transferred. In so doing the system provides the following services:
- Monitoring payments to accounts
- Real-time monitoring of account movement based on pre-authorization by customer
- Multi-bank payment & receiving transaction information, including balances on accounts held at other related bank accounts such as intra-day, end-of-day and forward balance
- Country specific payment entry screens showing built-in bank holiday Designated local banks by a Node will be based on the uniformed availability of above services provided individually or through a network of partners. They generally support open network of S.W.I.F.T communicating through the protocols known as MT 940 for data exchange and MT 103 for transferring funds. See FIG. 200

Clearing Functions at a Node:

The clearinghouse defines the financial integrity of a Node operation. For this purpose a series of safeguards are put in place.

1. A fully segregated Fiduciary account acting as a common fund for settlement purpose. The system allows the Escrow account, operating as an electronic book keeping account for clearing trades, to withdraw from or deposit to Fiduciary account at any time that a customer executes a trade. The account identifies all funds with customers and otherwise operates as money market account. See FIG. 300
   a) Fiduciary account accepts deposits as they are tagged to an individual identifier (pin) using ACH payments system. See FIG. 100
   b) a two way fund transfer from Fiduciary account to an Escrow account takes place:
      instruction from Escrow account to Fiduciary for blocking funds
      instruction from Escrow to Fiduciary for transfer of blocked funds
      instruction from Escrow to Fiduciary for re-deposit of funds
      instruction from Fiduciary to Escrow for minimum threshold warning
   c) continuous monitoring of Fiduciary account and Escrow account statements takes place.
   d) System allows withdrawal of un-blocked funds from Fiduciary account after each settlement event using ACH payments system. See FIG. 350 and FIG. 400

2. Time Needed for Clearing and Settlement—

Starting from the time that customer's fund has been deposited in the Fiduciary account the time elapsed for each event is as follows
   i. Time needed to block funds to allow trade execution after order placement at any Node is instantaneous
   ii. Time needed to clear (confirm) matched order is the time elapsed for moving money from fiduciary to escrow account. All such transactions take place at specified time of day in batch environment.
      within a Node: instantaneous
      between two Nodes in the U.S and Canada.: T
      between two Nodes in EU: T
      between the Nodes in the U.S. and EU:T+6
      between the Nodes in U.S. and the Far East: T+14
      between the Nodes in EU and the Far East: T+10

T indicates any time during a day and up to 24 hours. This is based on frequency of file delivery. FedACH now permits "pickup" four times a day by the receiving bank. The point of reference is the Node where the order match was initiated (based on time priority).

The time needed to settle account for purpose of cash offset contract including "marked-to-market" or contract default and final settlement is the time elapsed between clearing and fund adjustment to respective Fiduciary account.
      within a Node: T+12 between two Nodes in the U.S and Canada.: T+15
between two Nodes in EU: T+12
between the Node in the U.S. and EU:T+18
between the Nodes in the U.S. and the Far East: 2T+14
between two Nodes in EU and the Far East: T+16

Taking into account the time zone the system will be able to take advantage of some events being overlapped with respect to time between clearing and settlement in different zones as shown in Table 12 and exemplified below.

i) Two traders have made deposits on line in New York (via ACH), London and Tokyo (via same or different payment system). The New York trader's credit is confirmed at 10 am EST. He places order immediately. If a match is made in the same Node (New York) the clearing becomes effective the same day while the settlement takes place next day.

ii) If the match is made at a Node in the same region (San Jose, NAFTA) the clearing takes place next day after the match is made (the money is transferred from one Node's fiduciary account to another Node's escrow account). Depending on the nature and status of the transaction the settlement will follow reflecting the exact cash position of trader by transferring back (if any) funds from the escrow account at one center to fiduciary account of another Node. In a given Node, no physical movement of fund is made after initial deposit or prior to settlement and any movement of funds are merely blocked funds or internally transferred funds from Node's Fiduciary account to Escrow account. Any physically movement of fund is deferred until the next settlement cycle.

iii) If a match is made in a different region (Tokyo, ASIA) the clearing will take place (using a SWIFT protocol in Tokyo bank where the other Node maintains its fiduciary account) at least next day plus 14 hours (day 3). The risk element here can only be managed by requiring a maintenance margin above and beyond the standard initial margin. As the ACH payments system becomes more acceptable and the frequency of "file delivery and pickup" increases T can be reduced to 12 hours. The maximum elapsed time will then be reduced to 26 hours.

iv) With respect to "overlapping" of time consider a match made in Singapore Node (match originated at some Node), the clearing takes place in day 2 and settlement in day 3, but if the match was made in New York Node both clearing and settlement would have been completed in day 2

3) Inter Fiduciary Accounts Between Any Two Nodes

If all banks utilize ACH as payment system the assumption is that all respective national clearinghouses will be able to communicate on a common platform as if two Nodes with fixed currency were communicating. If any of the two Nodes uses different payments the timing will not change, but the low cost of ACH will no longer hold. The communications among the fiduciary accounts in this case are shown in FIG. 700. The user in Node A, for example, makes an ACH transaction (debit or credit). The user at Node B makes a similar EFT utilizing SWIFT MT103 protocol transaction. The system uploads each at respective Partner bank of Nodes A & B and the banks transmit the same to national "clearing house. Once, each clearing house verifies the payments (matches) the results are transmitted back to the Partner banks and ultimately to Fiduciary accounts at the Nodes. The fund movement among the Nodes Fiduciary accounts is controlled through a "hub" which itself acts as an intermediary "clearing" of a match for which a payment was originated.

In FIG. 500 depicts such a scenario where a network of Partner banks provide a unified user interface. For example:
Bank Brussels Lambert, in Frankfurt
Bank One in London
Bank One in the US
Fuji Bank in Japan
Unibank in Singapore
Unibank in Hong Kong
Scotiabank in Toronto These banks all use a common payments system as well as exchange of customers authorized banking data.

3. Continuous Clearing

All Nodes are inter networked so that matching can take place even if a particular Node is locally closed. This assumes that a request for match is pending.

For the Nodes outside the ACH connectivity transaction will require communication using SWIFT protocol (MT 103) through Partner bank. For example Bank A, in US submits messages to user, bank B, in Tokyo. See FIG. 450

If a Node is closed at the time of matching the matched trade is temporarily stored as "cleared" order until the corresponding Node is open to perform settlement through its local bank.

4. Settlement

Settlement generally refers to the trader's position at the end of trading session. There are two types of settlements:

4a. Settlement as cash offset—The system interprets this as the settlement between the Escrow and Fiduciary account within the same time zone as long as there is sufficient fund in the Fiduciary account for trade. Any other discrepancy or deficiency is settled between the Fiduciary account and the Node's Partner local bank. See Table 11

4b. Settlement Other Than Cash Offset

Settlement for Physicals

Flexible warehouse configurations of storage space allows consolidation and easy routing of standard shipped components. In a pipelined warehousing model, inventories are maintained in multiple designated warehouses. Three functions are incorporated: Receiving, Unloading and inspection and transshipment; they are detailed in Appendix B.

5. Risk Management

There are various elements of risks ranging from the initiator's inability to deliver (from clearing to settlement) that may arise from large volume, to technical or operational including errors. In certain cases defaults could result in chain reaction having a Domino effect. Ignoring fraud as a possible risk element the Nodes employ certain safeguards to "manage" risk.

Margin methodology is the most commonly used tools for risk management. It is usually cash based and has two components:
Premium margin—fixed for a product, based on exchange rules
Additional or maintenance margin-variable margin based on pricing structure and product To address the variable margin, the existing exchanges' clearinghouses (OCC's Theoretical Inter Market Margin System (TIMS) and CME's Standard Portfolio analysis of Risk (SPAN) use certain techniques for measuring, monitoring and managing level of risk exposure of clearing members portfolio that includes futures, options and option on futures. Generally, the margins cover all positions (the portfolio) related to underlying product and combine risks of closely related products prices. The pricing model projects liquidation value of a portfolio based on products market current price and volatility, both historical and Implied. All margin calculations use standard deviation for each class group. Member default is protected by collateral used for above mentioned margins, then by the set-aside clearing funds and finally by assessing members for additional funds.

Cross Border Effect

In Open Clearing System an additional element contributing to variable margin is introduced. That being the risk of elapsed time between clearing and settlement in various time zones.

6. Variable Currency

In all discussion the assumption was made that transactions between any two Nodes are based on fixed currency. Payments Systems for fund transfer with different currencies between Nodes is shown in FIG. 800.

Since each Node operates in its local currency the matching transaction between two Nodes with different currencies will require a universal fixed currency (e.g, US Dollar). Each Node maintains a limited amount of reserve fund in US dollar (as fixed currency). The following example shows how the clearing takes place in this case.

Assume a transaction is made at Node A
1. on day one the matched contract made in US Dollar is worth X in local currency
2. on day two the contract is worth Y in local currency
3. assuming settlement was made on day two, if X–Y is positive (decrease in value, local currency depreciated) the buyer needs to add additional amount in his currency (US Dollar). If X–Y is negative (increase in value) the seller adds the needed local currency.
4. these additional moneys are deposited (via respective Fiduciary accounts) into respective Escrow accounts.
5. the reserved moneys of the Node will be then used as "maintenance" deposit for daily currency fluctuation.
6. in the event that buyer is at Node A and seller at Node B the procedure reverses.

Example

A Scenario for currency embedded risk exposure is described below.

Assume that a contract is worth US$100,000 to buyer in the US and SPD182,000 to the seller in Singapore. It is a 90 day contract and performance bond for each trader is US$10,000 and SPD18,200 respectively. The local currency reserve at Node A is SPD3,000,000 and US$2,000,000

At time $T_1$ (before the settlement of the day) the currency conversion rate is at SPD1.825 to US$1.000 and the contract is now at 182,500

The required SPD500 must now be added to the performance bond at Node A, but since the seller at Node A had sold in Singapore Dollar he is immune to fluctuation. Here enters the marketplace (NODE A) which will take SP$500 from the reserve account, converts and adds to US$ reserve account. The reserve is now showing account: SP$2,999,500 and US$2,000,000

If the currency had appreciated to sp$181,500 the deficiency of sp$500 would have been made by taking equivalent amount from US Dollar reserve and crediting that to local currency account (of buyer's node):

SP$3,000,000 US$1,999,500

Such scenario assumes that:
Conversion takes place at every daily settlement session
The conversion rate is for a fixed time of day (fixed spread)
Any currency (overnight) gap is an assumed risk within the operation of a Node More extensive trading scenarios are described in Appendix C

APPENDIX A

Setting up web based ACH access
A customer creates a payment request providing such information as:
Participant's Authorization form for payment/deposit includes Transit Routing #, Account # and name (or canceled check)
Account number (PIN). This is tagged to the deposited funds
Amount to be transferred from customer's account
method of remittance (ACH)
date (day and hour) to complete payment
The relevant information about the customer's account is already available in the system during the setting up of the user.
The system sets up the ACH transaction and sends it to the designated bank by uploading to bank's interface. File delivery may take a day before activating next transaction. The bank intimates the system in case of a failure in the ACH process

APPENDIX B

Bonded warehouse operation for physicals
In the physical world, where a security represents a physical product, a Bonded Warehouse (BW) is attached to the "Depository" to ensure delivery of physicals.
Settlement usually involves commercial banks for payment and (in case of physicals) shipping industry for delivery of goods.
a) Receiving
consolidation complex multi-leg distribution cuts costs and expedites delivery
We have selected three "bonded" warehouse locations: Subic Bay, Peugeot Sound and Frankfurt area. These locations will serve suppliers of the Far East, NAFTA region and EU in terms of the proximity for each seller
When your products are shipped to our designated warehouse, we verify all paperwork, visually inspect packaging for damage, and record delivery date and time. Products will be available for fulfillment within 24 hours of receipt
b) Unloading and Inspecting
When your products arrive at our designated warehouse, we verify all paperwork, visually inspect packaging for damage, and record delivery. Products will be available for fulfillment within 24 hours of receipt.
c) Check-in
At receiving, we check in all elements of received goods by item number or serial/lot number, confirm the packing slip, and generate a receiver to document the process. Shipper is notified that a shipment has been received.
d) Transshipping
As soon as the destination of the (buyer) receiver is determined and depending on the proximity the specified goods will be moved within the three warehouses immediately.
Unloading and Inspecting
When buyer's products arrive at the next designated warehouse, we verify all paperwork, visually inspect packaging for damage, and record delivery date and time. Products will be available for final delivery.
Local Pickup and Delivery
Stocking The seller (supplier) makes a routine arrangement with its local/regional carrier to deliver the goods to our designated bonded warehouse. This leg of shipment is the only shipping charges that would be borne by the seller. The buyer, on the other hand will only pay to the carrier to collect the goods from his nearest designated warehouse. To each party, the buyer or the seller, the cost of transshipping is included in the initial cost

APPENDIX C

Detailed Trading Scenario

A trader places a 30-day buy order, forward contract 10,000 widgets at $2.00 each on January 15. The transaction is matched and an open order is created for the two parties involved.

First the Transaction Within a Node is Being Analyzed

1. If a buy order for $20,000 with delivery date of 30 days was placed in January 15, it is expected that a payment of $20,000 be made to seller by February 14. Until such time a performance bond representing, say, 10% of total contract, $2,000 is moved from buyer's account within Fiduciary and deposited in Escrow account This function requires the following
   a) buyer's deposit of at least one and half times $3,000 from his bank to Fiduciary bank account is made. This generally is being performed via local banks protocol (in US, ACH)
   b) internal transfer from fiduciary account to Escrow account. This can be done in "virtual" environment without any banking protocol In mid February when the delivery is made the entire amount of contract, $20,000 will have to be deposited to Fiduciary account and the performance amount must be returned to buyer. The requirements are
   a) buyer's account within the Fiduciary will be debited $20,000
   b) buyer's deposit of $3,000 will be re deposited to his account in Fiduciary As for the seller account the (a) and (b) of performance bond function will be repeated. For the delivery section:
   a) seller's account within the Fiduciary will be credited $20,000
   b) seller's deposit of $3,000 will be re deposited to his account in Fiduciary Now assume buyer is in trading location with payment system different from seller's bank. Furthermore buyer's location is US Dollar based and the seller is JY denominated.
   a) performance bond deposit function remains the same; buyer's account at Fiduciary (Node A) is in US Dollar and seller's account in Fiduciary (Node B) is in JY.
   b) internal transfer from fiduciary account to Escrow account is done in done without any banking protocol. Each account is in respective currency.

In mid February when the delivery is made the entire amount of contract, $20,000 will have to be deposited to Fiduciary account and the performance amount must be returned to buyer. The requirements are
   a) In Node A, buyer's account within the Fiduciary will be debited $20,000
   b) buyer's deposit of $3,000 will be re-deposited to his account in Fiduciary As for the seller account (a) and (b) of performance bond function will be repeated. For the delivery portion:
   a) In Node B seller's account will be credited as follows
      i) a US Dollar account resides next to JY Fiduciary account
      ii) the inter-bank US $ to JY conversion rate will be used to move equivalent amount of JY to seller's Fiduciary account. Alternatively, the fund transfer from US Node (Fiduciary account) to Japan Node (Fiduciary account) can assume fixed-to-fix currency as long as the Node maintains both currencies.

2. The 30 day forward price may change before delivery. The order (buy or sell) for $20,000 is executed on the basis of 30 day forward price at the date which is cleared.
   a) If the new contract price becomes $22,000 at any time before daily settlement it will be necessary to adjust the performance bond
   b) Now, the difference between the order date price and delivery date price is $2,000. The adjusted performance price from seller will be made in equivalent of JY. If at the time the currency has also appreciated the amount will reflect $2000×delta of currency.
   c) If the new contract price becomes $18,000 (a) will be repeated, but because of maintenance of dual currency fix-to-fix currency enables the payment adjustment to buyer's performance bond be simply made in USD 2,000.

If any contract is re-traded prior to expiration the transaction assumes the form of cash offset as previously described.

The invention claimed is:

1. A cash management data processing system for multi-location standardized trading, allowing financial clearing between any two Nodes or within a single Node linked to banking payment systems, comprising:
   a) Fiduciary and Escrow accounts at each Node;
      wherein each said Node is comprised of a trading platform;
      wherein a Fiduciary account holds local currency and at least one foreign currency as base currency for purposes of a financial transaction;
   b) an electronic processor for bi-directional fund movement between said Fiduciary account and an Escrow account;
   c) an electronic intelligent hub for matching orders among said Fiduciary account and different said Nodes;
   d) a second electronic processor for fund movement from said Fiduciary account to another for financial clearing;
      wherein said second electronic processor utilizes a price matching engine in a selected base currency; and provides daily cash settlement reporting;
   e) a third electronic processor for reporting a daily account statement marked-to-market of said fiduciary account;
   f) a fourth electronic processor for generating physical delivery receipt against cash settlement.

2. The system of claim 1, wherein the required funds for said Fiduciary account's pending match will be blocked from said Fiduciary account by blocking said transaction from occurring at a sub-fiduciary account;
   wherein the sub-fiduciary account is found within said Fiduciary account.

3. The system of claim 2 wherein said blocked funds from said Fiduciary account are moved to said Escrow account in said base currency after a match is made.

4. The system of claim 3, wherein a daily price adjustment to the blocked funds in said Escrow account is made reflecting marked-to-market cash value of transaction for settlement purpose of open orders, not yet fulfilled.

5. The system of claim 4, wherein said marked-to-market pricing triggers movement of funds between said Fiduciary and said Escrow account to make the necessary adjustment by adding funds or withdrawal of excess funds.

6. The system of claim 5, wherein the net amount retained in said Escrow account resulting from said movement of funds between said Fiduciary and said Escrow accounts constitutes daily cash settlement required for avoiding liquidation of said order.

7. The system of claim 1 wherein, designated bonded warehouses are utilized for said physical delivery settlement to guarantee availability of goods.

8. The system of claim 7, wherein physical delivery settlement is made by, exchanging bonded warehouse digital receipt of goods with electronic fund transfer from said Fiduciary account, constituting electronic cash on delivery (COD).

9. The system of claim 1, wherein said financial clearing between two said Nodes is accomplished by transferring funds from said Fiduciary account to a second Fiduciary account in said base currency.

10. The system of claim 9, wherein said transferred funds are moved to said fiduciary account from said second fiduciary account; and
from said fiduciary account to said Escrow account.

11. The system of claim 10, wherein said transferred fund to said Escrow account constitutes the additional fund required to complete settlement process in the said Node that match was made.

12. The system of, claim 1 wherein the time period for daily settlement reflects the time, T, representing execution of the trade to T+1, representing settlement date plus time zone difference which includes International Date Line.

13. The system of claim 1 wherein said banking payment system includes the Automatic Clearing House (ACH) format and Rules utilization whenever said Fiduciary account in said Node communicates with Federal Reserve Automatic Clearing House directly, or via the National Clearinghouses in North America.

14. The system of claim 1 wherein Society of Worldwide Interbank Financial Transaction (SWIFT) protocols are utilized for communication within said Node of said Fiduciary account executing said electronic fund transfer between another said Node in different locations for financial clearing and settlement.

15. The system of claim 14 wherein said payments in foreign currency are interbank currency exchange rates at noon time, Eastern Standard Time, captured for the purpose of moving funds between said Fiduciary account and said Escrow account at the end of each trading day for settlement purposes.

* * * * *